(12) United States Patent
Hammond

(10) Patent No.: US 7,619,154 B2
(45) Date of Patent: Nov. 17, 2009

(54) INSTRUCTIONAL DEVICE AND METHOD FOR PIANO OR OTHER MUSICAL KEYBOARD

(76) Inventor: Patrick Hammond, 7604 Elliott Dr., Raleigh, NC (US) 27613

( * ) Notice: Subject to any disclaimer, the term of this patent is extended or adjusted under 35 U.S.C. 154(b) by 7 days.

(21) Appl. No.: 11/424,726

(22) Filed: Jun. 16, 2006

(65) Prior Publication Data

US 2007/0289431 A1 Dec. 20, 2007

(51) Int. Cl.
*G09B 15/00* (2006.01)
*G09B 15/06* (2006.01)
*G09B 15/08* (2006.01)
*G10G 1/02* (2006.01)

(52) U.S. Cl. .......................... 84/433; 84/423 R; 84/436; 84/470 R; 84/476; 84/477; 84/478; 84/485 R; 84/485 SR; 84/482

(58) Field of Classification Search ............... 84/13–15, 84/169, 315–317, 319, 423 R, 424, 425, 427, 84/428, 433, 436, 442, 443, 470 R, 471 R, 84/471 SR, 472–476, 477 R, 478, 479 R, 84/479 A, 480, 481, 482, 483.2, 485 R, 485 SR
See application file for complete search history.

(56) References Cited

U.S. PATENT DOCUMENTS

| | | | |
|---|---|---|---|
| 352,965 A | 11/1886 | Weir | |
| 397,815 A | 2/1889 | Osborn | |
| 765,937 A | 7/1904 | Reese | |
| 996,935 A | 7/1911 | MacMaster | |
| 1,811,865 A | 6/1931 | Rogers | |
| 3,101,023 A | 8/1963 | Weis | |
| 3,130,627 A | 4/1964 | Aaron | |
| 3,691,895 A * | 9/1972 | Nessler | 84/471 R |
| 3,850,072 A * | 11/1974 | Fuller | 84/471 R |
| 3,921,493 A * | 11/1975 | Leonard | 84/474 |
| 3,937,118 A * | 2/1976 | Leonard | 84/471 SR |
| 4,254,686 A * | 3/1981 | Leonard | 84/481 |
| 4,750,399 A * | 6/1988 | Coles | 84/478 |
| 5,011,412 A * | 4/1991 | Rosenberg | 434/227 |
| 5,107,744 A | 4/1992 | Bradley | |
| 5,524,522 A * | 6/1996 | Hesnan | 84/473 |
| 6,348,649 B1 * | 2/2002 | Chen et al. | 84/477 R |
| 6,632,991 B2 * | 10/2003 | Chen | 84/471 R |

* cited by examiner

*Primary Examiner*—Jeffrey Donels
*Assistant Examiner*—Christopher Uhlir
(74) *Attorney, Agent, or Firm*—Alston & Bird LLP

(57) ABSTRACT

An instructional device and associated method for illustrating the positions of keys and their associated notes on a keyboard are provided. The instructional device includes key markers that are adjustably mounted on a support structure in a configuration corresponding to the keys of a keyboard. The key markers correspond in size to the keys of the keyboard and are adjustable between the ends of the group of markers. Indicators are provided on the markers to indicate a chordal relationship between a respective one of the markers and the other markers. Thus, the device can be used, e.g., to indicate the position of the keys on a piano keyboard and, further, to indicate the relationship of the keys and associated notes to one another, such as by identifying various chordal relationships. In addition, the device can be adjusted to thereby illustrate such key positions and note relationships in connection with an inversion of one or more of the key markers relative to the others.

23 Claims, 6 Drawing Sheets

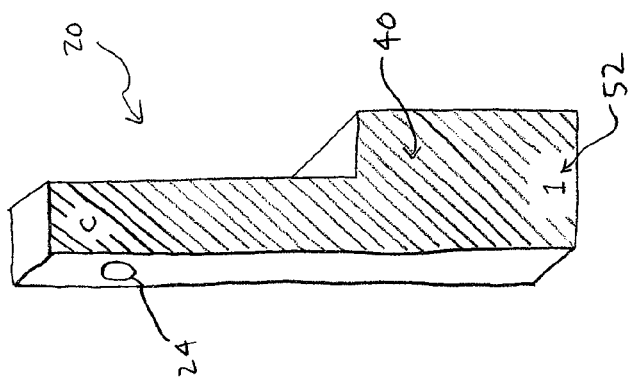
FIG. 4
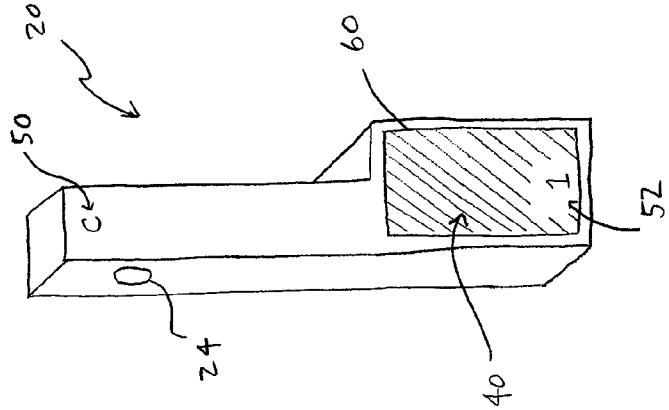
FIG. 5
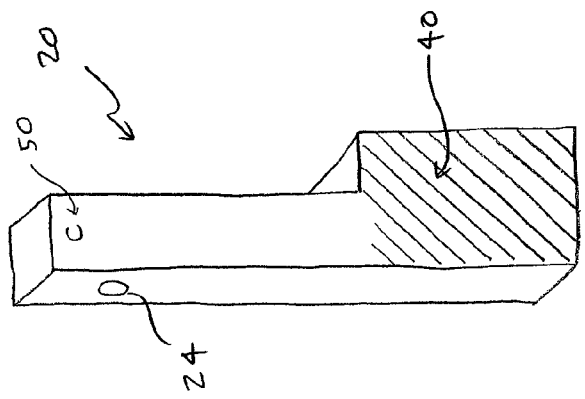
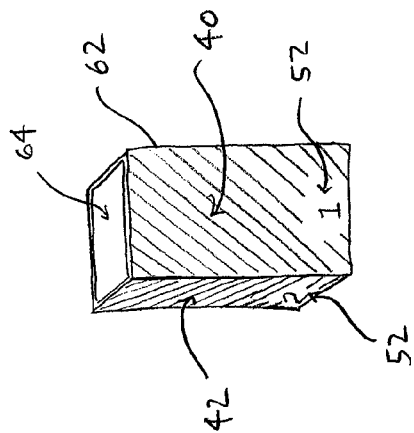
FIG. 6

INSTRUCTIONAL DEVICE AND METHOD FOR PIANO OR OTHER MUSICAL KEYBOARD

BACKGROUND OF THE INVENTION

1) Field of the Invention

The present invention relates to an instructional device for illustrating the positions of keys of a piano keyboard or other musical instrument, such that the device can be used for illustrating the position of the keys and/or the relationship between the keys.

2) Description of Related Art

A piano typically includes eighty-eight keys that are arranged in a musical keyboard that is generally similar to the keyboards of other instruments such as the harpsichord, clavichord, organ, electronic piano, synthesizer, celesta, dulcitone, accordion, melodica, glasschord, and carillon. The keys are arranged in repeating octaves. Each octave is defined by twelve keys that are used to produce the notes of the Western musical scale. Each octave typically includes seven white keys, which are used to produce the natural notes of the C major scale, i.e., C, D, E, F, G, A, and B. In addition, each octave typically includes five black keys, typically referred to as accidentals or sharps, i.e., C#/Db, D#/Eb, F#/Gb, G#/Ab, and A#/Bb, which are disposed between the white keys such that each key is a half-step or half-note from the successive keys.

Devices and methods have been developed for illustrating the identity of each of the keys on such a keyboard, i.e., the note produced by pressing the respective keys. For example, a paper illustration can be provided to identify the location of different keys on the keyboard and combinations of keys for producing chords that include multiple notes. Such illustrations can assist a person in identifying the notes associated with each key and the keys associated with different chords. However, such instructional illustrations are typically cumbersome to use and limited in applicability. That is, separate illustrations must be provided, e.g., to illustrate the keys for various chord or scales. Further, such illustrations generally do not assist the person in understanding the relationship between the notes or the modifications that can be made to any particular scale or chord.

Accordingly, there exists a need for an instructional device and an associated method for facilitating the illustration of the position of and relationship between the keys and the associated notes of a keyboard. Further, the instructional device should be adaptable for illustrating the notes of different or modified chords or scales.

BRIEF SUMMARY OF THE INVENTION

The present invention provides an instructional device and method for illustrating the positions of keys and their associated notes on a keyboard, such as a piano having a keyboard of white and black keys. In addition to indicating the position of the keys and their associated notes, the device can be used to indicate the relationship of the keys and notes to one another, such as by identifying various chordal relationships. Further, the device can be adapted to adjust and thereby illustrate the position of keys and relationship of their notes keys in any octave or multiple octaves, e.g., to indicate an inversion that is performed by substituting keys of lower or higher octaves in a chord or scale.

According to one embodiment of the present invention, the instructional device includes key markers that are adjustably mounted on a support structure. For example, the support structure can be a continuously extending guide member, such as a curved rod that defines a continuous loop or path, and each key marker can include a block that is movably disposed on the guide member, e.g., by disposing the curved rod through an aperture of each block.

The key markers can include a first plurality of markers that correspond in size to the white keys of the piano and a second plurality of markers that correspond in size to the black keys. For example, the first plurality of key markers can correspond in shape to the shape of the white keys of the piano, and the second plurality of key markers can correspond in shape to the shape of the black keys of the piano, so that the key markers can be structured to be disposed in a configuration that corresponds to the keys of the piano with at least some of the key markers being disposed adjacent at least three of the other key markers. Further, the width of each key marker can be the same as the corresponding key of the piano so that the key markers can be disposed adjacent the keyboard, e.g., by resting the device on the keyboard, with each key marker aligned with the corresponding key.

The key markers are adjustably mounted on the support structure in a configuration corresponding to an octave (or multiple octaves) of the keys of the piano. Each marker is adjustable from a position at one end of the markers to a position at an opposite end of the markers, so that the markers can be successively moved from one end of an illustrated octave to the opposite end to thereby illustrate any octave of keys, with any starting and ending keys for the octave. The number of key markers can be a multiple of twelve so that the key markers correspond to a whole number of octaves of the keyboard and so that, as each key marker is moved from a first position at one end of the markers to a second position at an opposite end of the markers, the key marker represents the same note in different octaves.

Indicators are provided on the markers. Each indicator indicates a chordal relationship between a respective one of the markers and the other markers. For example, non-textual indicators can include colors that are indicative of a chordal relationship between corresponding notes of the piano. The markers can also define textual indicators, such as numeric indicia indicating a chordal relationship between corresponding notes of the piano, and/or the letter or other designation of a respective key and note. The indicators can be fixed on the markers, or the indicators can be releasably connected to the markers so that each indicator is configured to be removed from one of the markers and moved to another marker. According to one aspect of the invention, each marker can define a first indicator on a first side of the marker and a second indicator on a second side of the marker.

According to another embodiment, the present invention provides a method of illustrating the positions of white and black keys of a piano or other instrument. The method includes providing first and second pluralities of key markers on a support structure and selectively adjusting a respective marker from a position at one end of the markers to a position at an opposite end of the markers and thereby inverting the configuration of the markers such that a plurality of indicators provided on the markers indicate a chordal relationship between the markers.

The key markers can be provided as blocks that are disposed on a continuously extending guide member, such as by disposing a curved rod defining a continuous path through an aperture of each block of each marker. The first and second pluralities of key markers can be provided to correspond in shape to the white and black keys of the piano, respectively, such that the key markers are structured to be disposed in a configuration that corresponds to the keys of the piano with each key marker disposed adjacent at least three of the other key markers. Further, each key marker can be provided with a width that is the same as a corresponding key of the piano so that the key markers are structured to be disposed adjacent the keyboard with each key marker aligned with the corresponding key. The key markers can be provided in a number that is a multiple of twelve so that the key markers correspond to a whole number of octaves of the keyboard. Colors and/or numeric indicia can be provided on each key marker to indicate a chordal relationship between corresponding notes of the piano. In some cases, the indicator can be adjusted, e.g., by removing an indicator from one marker and moving the indicator to another one of the markers.

Thus, the instructional device and method of the present invention can be used to facilitate the illustration of the position of, and relationship between, the keys and the associated notes of a keyboard. Further, the instructional device can be adaptable for illustrating the notes of different or modified chords or scales.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 is a perspective view illustrating one of the key markers of the instructional device of FIG. 2;

FIG. 5 is a perspective view illustrating a key marker of an instructional device according to another embodiment of the present invention;

FIG. 6 is a perspective view illustrating a key marker of an instructional device according to another embodiment of the present invention;

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
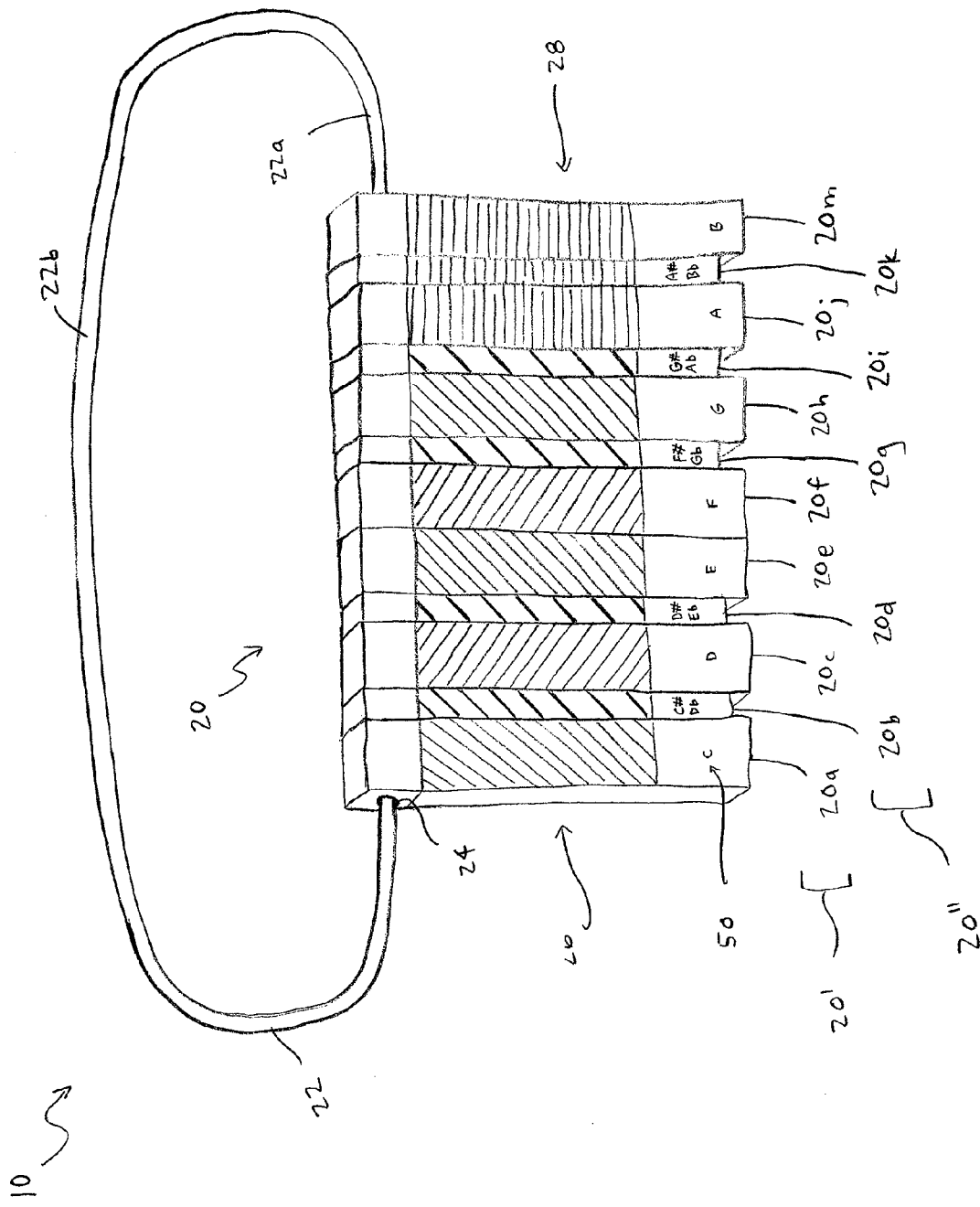
FIG. 1 is a perspective view illustrating an instructional device according to one embodiment of the present invention.

Referring now to the drawings and, in particular, to FIG. 1, there is shown a musical instructional device 10 according to one embodiment of the present invention. The instructional devices of the present invention can be used to illustrate the keys of a keyboard and the associated notes produced by the keys. In particular, the instruction device 10 includes key markers 20 that can correspond to the keys of a piano keyboard or the keyboard of other instruments such as a harpsichord, clavichord, organ, electronic piano, synthesizer, celesta, dulcitone, accordion, melodica, glasschord, or carillon.

The key markers 20 can be adjustably mounted on a support structure 22. For example, as illustrated in FIG. 1, each of the key markers 20 is a block-like structure that defines an aperture or bore 24 therethrough, and the support structure is a continuously extending guide member 22, such as a curved rod that defines a continuous loop or path. The guide member 22 extends through the apertures 24 of the key markers 20 so that the markers 20 can be moved, individually or in combinations, along the guide member 22. That is, as described below, each key marker 20 can be moved along the length of the guide member 22 and adjusted between a position at one end 26 of the markers 20 and a position at the opposite end 28 of the markers 20. The support structure 22 and key markers 20 can be formed of various materials, such as wood, metal, or plastic.

In other embodiments of the present invention, various other types of support structures can be provided, such as tracks, bars, ropes, strings, other lanyards, and the like. For example, the support structure can be a track that slidably engages the key markers 20 by a T-shaped slot and a corresponding T-shaped protrusion, each of which is provided on the track or the markers 20. Flexible support structures, such as lanyards, can be disposed through the apertures of the key markers 20. A track, or the rod shown in FIG. 1, can be a rigid or flexible structure. In the case of a rigid support structure, the support structure can define multiple runs or generally linear portions that are connected by curved or angled portions. For example, as shown in FIG. 1, the markers 20 are show positioned in a group on a first run 22a of the guide member 22, and the markers 20 can be individually moved along the second run 22b to adjust each marker 20 to an opposite end of the group of markers 20. The runs 22a, 22b can be slightly outwardly curved, as shown in FIG. 1, such that the markers 20 tend to collect in a group, with the markers 20 in contact with one another when the guide member 22 is held upright with the markers 20 hanging from one of the runs 22a, 22b.

The keys markers 20 are typically arranged in repeating octaves. For example, in the embodiment illustrated in FIG. 1, twelve key markers 20 are provided on the support structure 22, and each key markers 20 corresponds to one of the twelve keys of an octave of a conventional piano keyboard. In other embodiments, other numbers of key markers 20 can be provided, e.g., a greater or fewer number than twelve. The number of key markers 20 can be an even multiple of the number of keys in each octave of the associated keyboard so that the key markers 20 correspond to a whole number of octaves of the keyboard. Thus, for a conventional piano keyboard having twelve keys in each octave, the number of key markers 20 provided in the device 10 can be twelve, twenty-four, thirty-six, or any other multiple of twelve. In this way, the key markers 20 can represent a succession of keys that, when repeated successively, corresponds to all of the keys on the keyboard. Further, each key marker 20 can be moved from one end of the markers 20 to the opposite end and continue to represent the same note in different octaves.

The key markers 20 can be provided with a size and/or shape that corresponds to the associated keys of a keyboard. For example, as shown in FIG. 1, a first plurality 20' including seven of the key markers, indicated individually by reference numerals 20a, 20c, 20e, 20f, 20h, 20j, 20m, corresponds to the seven white keys of one octave of keys on a piano keyboard 30

(partially illustrated), i.e., the keys for the notes of C, D, E, F, G, A, and B. A second plurality 20' including five of the key markers, indicated individually by reference numerals 20b, 20d, 20g, 20i, 20k, corresponds to the five black keys of the same octave of keys on the keyboard 30, i.e., the keys for the notes of C#/Db, D#/Eb, F#/Gb, G#/Ab, and A#/Bb. Each of the key markers 20' in the first plurality has a width that is greater than the width of the key markers 20" in the second plurality. In other words, the key markers 20' representing the white keys of the keyboard 30 are wider than the key markers 20" that represent the black keys of the keyboard 30, thereby providing a visual resemblance by relative size to the corresponding keys of the keyboard 30.

In other embodiments, the key markers 20 can also correspond to the shape of the keys of a keyboard 30. For example, in the embodiment illustrated in FIG. 2, each of the key markers 20 has the same shape as the corresponding keys 32 of the illustrated piano keyboard 30. Generally, each of the black keys 32a on the piano keyboard 30 has a width that is uniform along its length and equal to the width of the other black keys 32a, and each white key 32b has a shape different than the other white keys 32b and a nonuniform width along its length that is relatively narrow in a first portion 34a nearest the back of the piano keyboard 30 and relatively wider in a second portion 34b that is nearest the front of the piano keyboard 30. Similarly, each of the key markers 20 can have a corresponding shape so that each key marker 20 provides a visual resemblance by shape to the corresponding key 32a, 32b of the keyboard 30. In this configuration, each of the key markers 20' can be located adjacent three or more of the other markers 20. This is unlike the device of FIG. 1, where each marker 20 can be placed adjacent a maximum of two other markers 20. For example, as shown in FIG. 1, the key marker 20c is adjacent only the two markers 20b, 20d. On the other hand, in FIG. 2, the key marker 20c is adjacent four of the markers 20a, 20b, 20d, 20e.

Figure 2:
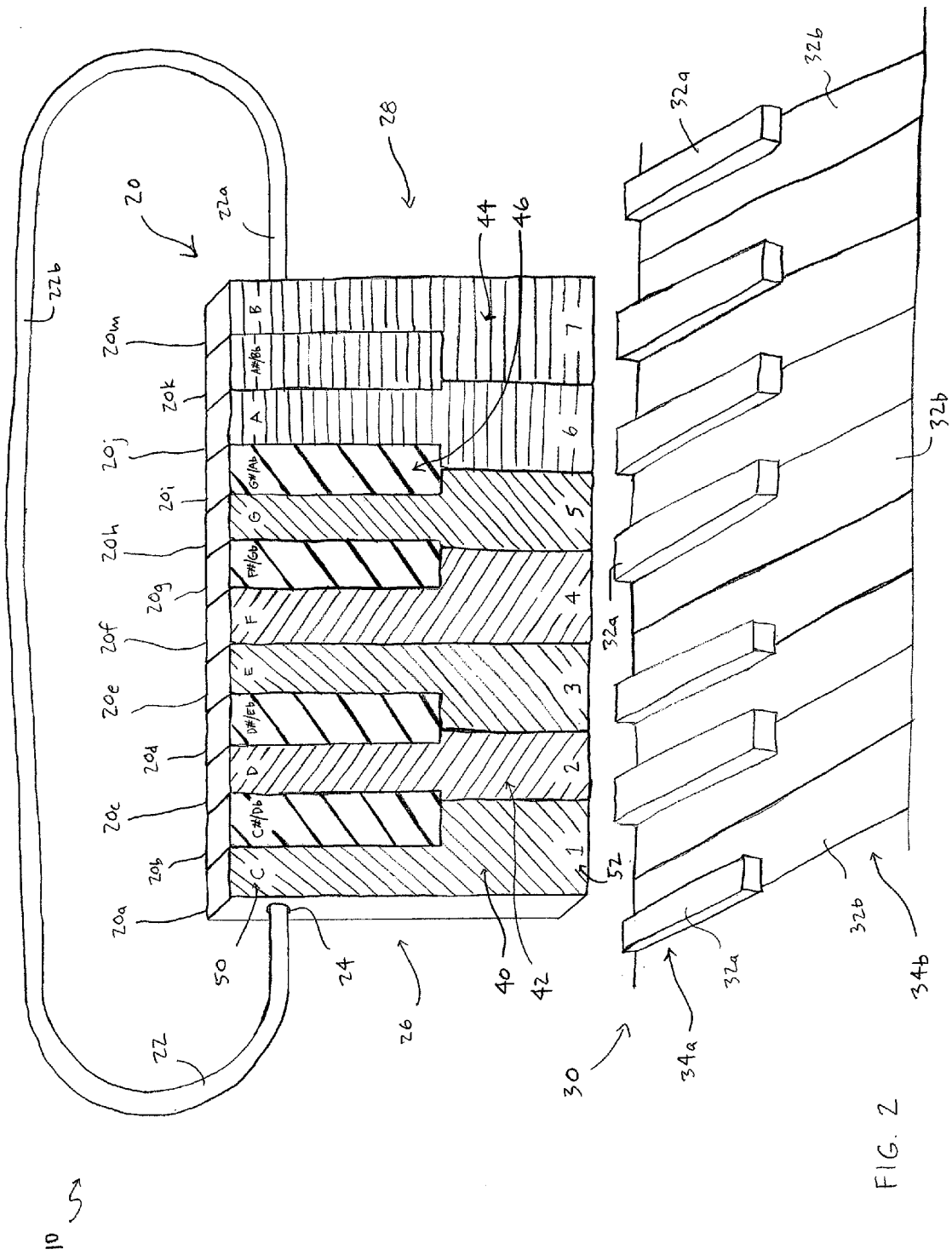
FIG. 2 is a perspective view illustrating an instructional device according to another embodiment of the present invention, shown adjacent the keys of a piano keyboard.

In addition, as shown in FIG. 2, the width of the key markers 20 can be the same as the width of the standard keys of the piano keyboard 30. Thus, the key markers 20 can be disposed adjacent the keyboard 30, e.g., by resting the key markers 20 directly on the keys of the piano keyboard 30, with each key marker 20 being aligned with a corresponding one of the keys 32a, 32b of the piano keyboard 30.

Figure 3:
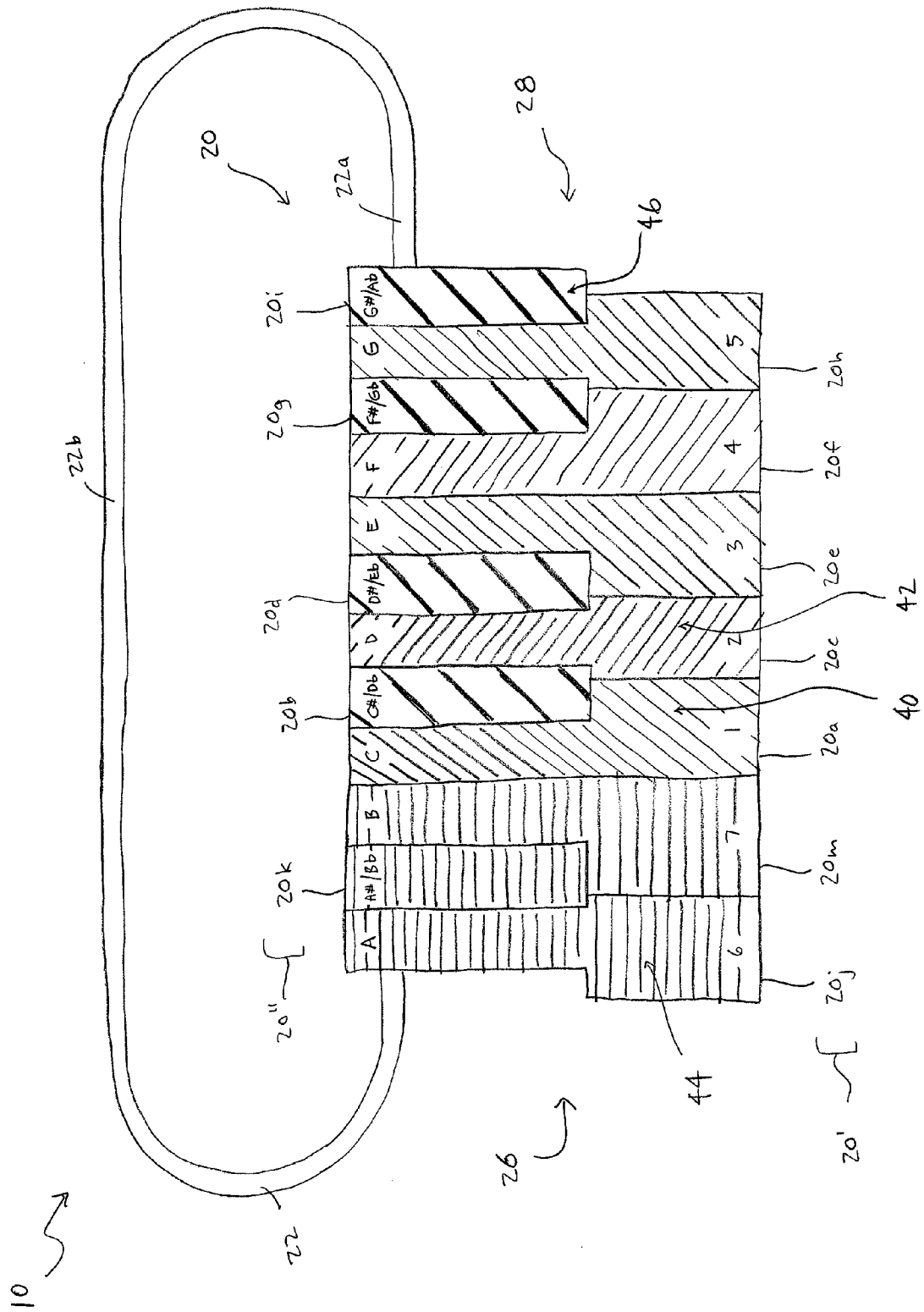
FIG. 3 is an elevation view illustrating the instructional device of FIG. 2 with the key markers of the instructional device adjusted to a different configuration than FIG. 2.

Each of the key markers 20 can be adjusted on the support structure 22, e.g., to modify the configuration of the key markers 20 on the support structure 22. When adjusted to different configurations, the key markers 20 can continue to correspond to the order of the keys 32a, 32b on the piano keyboard 30, even though different key markers 20 can be adjusted to the left-most and right-most positions among the markers 20. For example, FIGS. 1 and 2 show the key markers 20 in the order of an octave that begins with C and ends with B. Relative to the configuration of FIGS. 1 and 2, FIG. 3 shows a configuration in which three of the markers 20 have been adjusted from the right end 28 of the markers 20 to the left end 26. In particular, the markers 20j, 20k, 20m, which correspond to the keys for notes A, A#/Bb, and B, have been adjusted to a position left of the marker 20a corresponding to the key for note C. Thus, the markers 20 in FIG. 3 correspond to an octave beginning with A and ending with G#/Ab. Before and after the adjustment, the markers 20 correspond to the order of the keys 32a, 32b on the keyboard 30; however, the beginning and end notes of the octave illustrated by the device 10 (i.e., the notes represented at the left and right-most positions of the group of key markers 20) are modified in this way.

Similarly, each of the key markers 20 can be moved from one end 26, 28 of the group of markers 20 to the opposite end 26, 28. It will be appreciated that the key markers 20 can be moved from the left end 26 of the group of markers 20 to the right end 28 or from the right end 28 to the left end 26. Further, the markers 20 can be moved individually or in a group of any number of key markers 20. The markers 20 can be adjusted so that any of the markers 20 can be provided in the left-most position of the markers 20 and, thus, so that the markers 20 can correspond to any octave of successive keys on the piano keyboard 30.

The adjustment of the key markers 20 visually illustrates the continuity of the order of notes across one or more octaves. In particular, the markers 20 can be moved to visually illustrate the inversion of chords and notes. Inversion generally refers to the substitution or modification of notes of one octave with corresponding notes in another octave. For example, a C major chord can be formed of its three roots, e.g., a C note, the next higher E note, and the next higher G note. The chord can be inverted by substituting one or more of the notes with the same note of a higher or lower octave, i.e., a higher or lower tone. For example, an inverted C major chord can include a G note, the next higher C note, and the next higher E note, or the chord can include an E note, the next higher G note, and the next higher C note. Such inversion can be important in producing desired tones and can also be important in understanding how certain chords can be most easily played on the keyboard 30. For example, if the position of a person's hands while playing a particular chord or sequence of notes limits the notes that the person can easily access, the person may substitute notes some notes of a chord or sequence with other notes that are within the accessible range. In one example, if the person wishes to form a C major chord that includes a particular C key on the keyboard 30 but is unable to easily access the keys for E and/or G that are to the right of the C key on the keyboard 30, the person might instead substitute a key for E and/or G that is to the left of the C key. In addition, such inversion can be important in producing a desired musical effect, as will be understood by those skilled in the art.

By moving the markers 20 on the device 10, an inversion can be graphically illustrated. Thus, each marker 20 be inverted, i.e., moved from one end 26, 28 of the group of markers 20 to the other end 26, 28 of the group without moving at least some of the other markers 20 so that, before and after being moved, each marker 20 that is adjusted corresponds to a key for the same note but in a different octave. This is graphically illustrated in FIGS. 2 and 3. As described above, in FIG. 3 (relative to FIG. 2) each of the key markers 20j, 20k, 20m (which correspond to the notes A, A#/Bb, and B) have been inverted by moving those markers 20j, 20k, 20m from the right-most end of the group of markers 20 to the left-most end such that, before and after the adjustment, each of the three markers 20j, 20k, 20m continues to correspond to a key for the same note but in different octaves on the piano keyboard 30.

Non-textual indicia can be provided on the key markers 20 to provide a visual indication of chordal relationships between the markers 20. In one embodiment, colors or other designs on the key markers 20 are used to provide such visual indication of chordal relationships. In this regard, the cross-hatching shown on the different markers 20 is used to indicate different colors on the markers 20. For example, as shown in FIG. 2, the three markers 20a, 20e, 20h corresponding to the first, third, and fifth natural notes of a C major scale, which are the root notes of the C major chord, are provided with a first color 40 (e.g., red). A second color 42 (e.g., green) is shown on the markers 20c, 20f to indicate the second and forth notes of the scale, and a third color 44 (e.g., yellow) is shown on the markers 20*j*, 20*m* to indicate the sixth and seventh notes of the scale. Among the markers 20*b*, 20*d*, 20*g*, 20*i*, 20*k* corresponding to the black keys 32*a* of the keyboard 30, a fourth color 46 (e.g., blue) is shown on the markers 20*b*, 20*d*, 20*g*, 20*i*, and the third color 44 is shown on the marker 20*k*.

Thus, a person can easily identify the markers 20 for notes having particular characteristics and relationships according to the colors provided on the markers 20. For example, a person can easily identify the markers 20*a*, 20*e*, 20*h* as the root notes of a C major chord identified by the first color (e.g., red) regardless of the configuration in which the markers 20 are positioned. The markers 20*c*, 20*f* corresponding to the second and fourth notes of the C major scale (i.e., the tonic second and fourth) can be identified by the second color (e.g., green). The markers 20*j*, 20*m* corresponding to the sixth and seventh notes of the C major scale (i.e., the tonic sixth and seventh) can be identified by the third color (e.g., yellow). The accidentals or sharps 20*b*, 20*d*, 20*g*, 20*i*, 20*k* can be identified by their colors (e.g., blue and yellow). Thus, by referring to the colors on two markers 20, the person can identify how the corresponding notes are harmonically related. In other embodiments, different color schemes can be used to identify the various relationships between the notes associated with the key markers 20.

The colors can also provide an indication, e.g., of which keys are typically used to form particular chords or sequences of keys when playing in a particular key. For example, in the embodiment illustrated in FIG. 2, the notes associated with the three markers 20*a*, 20*e*, 20*h* indicated by the first color (e.g., red) are the root notes of the C major chord and often used when playing in the key of C major. The fourth color 46 (e.g., blue) can be provided on the markers 20*b*, 20*d*, 20*g*, 20*i*, which correspond to black keys that are typically not used when playing in the C major key; however, the third color 44 (e.g., yellow) is shown on the markers 20*k* corresponding to a black key that is occasionally used, e.g., when forming a C major dominant seventh.

In addition, textual indicators or indicia can be provided on the markers 20 to identify the associated notes produced by the corresponding keys of the keyboard 30 and/or to indicate the chordal relationships between the notes. For example, designations of the notes (C, C#/Db, D, D#/Eb, E, F, F#/Gb, G, G#/Ab, A, A#/Bb, and B) associated with each key marker 20 can be identified by note designations 50 provided on the markers 20. Further, as illustrated in FIG. 2, the seven natural notes of the C major scale are indicated sequentially by the numeric indicia or harmonic indicators 1-7, referred to generally by reference numeral 52. Thus, by referring to the numbers 52 on the key markers 20, a person can identify the chordal relationship between any two markers 20, in addition to the specific notes as represented by the note designations 50 and/or the shape or size of the markers 20. For example, in relation to the C note represented by the markers 20*a* with the numeral 1 thereon, the E note represented by the marker 20*e* with the harmonic indicator 3 thereon is a tonic third (four semitones higher than C), and the G note represented by the marker 20*h* with the numeral 5 thereon is a tonic fifth (seven semitones higher than C). Similarly, the other numerals 52 indicate that the markers 20*c*, 20*f*, 20*j*, 20*m* represent a tonic second, fourth, sixth, and seventh, respectively, to the C note.

The indicia on the markers 20 can facilitate the person's understanding of the chordal relationship between corresponding notes of the piano. In this way, the relative interval between each of the notes represented by the key markers 20 is indicated by the numbers indicated thereon. Thus, a person can form a chord or particular sequence of notes by selecting keys 32*a*, 32*b* on the keyboard 30 that correspond to the key markers 20 that are identified by certain colors 40, 42, 44, 46 or textual indicia 50, 52. For example, a conventional major chord (or major triad chord) can be formed by selecting keys 32*a*, 32*b* that correspond to the key markers 20*a*, 20*e*, 20*h* indicated by the first color 40 (e.g., red) or by the numerals 1, 3, and 5, even if the key markers 20 are adjusted to a different configuration on the support structure 22. Similarly, numerous other chords can be formed by selecting combinations notes corresponding to the key markers 20 having other relationships, as indicated by the colors 40, 42, 44, 46 and/or textual indicia 50, 52.

Although the numeric indicia 52 are only shown on some of the key markers 20 (and, in particular, only on the key markers 20' that correspond to the white keys 30*b* of the keyboard 30), it is appreciated that the indicia 52 can be provided on some or all of the markers 20. For example, the key markers 20" corresponding to the black keys 32*a* of the keyboard 30 can be provided with the numerals 2*b*, 3*b*, 5*b*, 5#, and 7*b*, respectively, to indicate the relationship between the corresponding notes and the C note represented by the markers 20*a*, i.e., that the corresponding black keys 32*a* represented by the markers 20*b*, 20*d*, 20*g*, 20*i*, and 20*k* produce a minor second (2*b*), minor third (3*b*), minor fifth (5*b*), augmented fifth (5#), and minor seventh (7), respectively. Further, in some cases, the key markers 20 can be provided with multiple textual indicia to indicate the multiple relationships between each respective key marker 20 and the other key markers 20. For example, where more than one octave of key markers 20 is provided, the key markers 20 can include additional indicia for illustrating extended relationships between octaves of notes, e.g., to indicate that a minor second (2*b*) is also a minor ninth (9*b*) of a lower octave, or that a fourth (4) of one octave is also an eleventh (11) of a lower octave. The chordal relationships of notes in different chords is further described in U.S. application Ser. No. 11/201,828 for "Instructional Device and Method for Guitar or Other Stringed Instrument," filed Aug. 11, 2005, the entire contents of which is incorporated herein by reference.

The color and indicia of the markers 20 can facilitate the person's understanding of the relationship between notes and chords of different octaves. That is, the adjustability of the key markers 20 can be used to illustrate the continuity between successive octaves. For example, by adjusting one or more key markers 20 from one end 26, 28 of the group of the markers 20 to the other end 26, 28 of the markers 20, it can easily be seen that the succession or pattern of the keys 32*a*, 32*b* on the keyboard 30 continues repetitively along the length of the keyboard 30. In addition, the adjustability of the key markers 20 can be used to illustrate possible substitutions of keys 32*a*, 32*b* for other keys 32*a*, 32*b* when playing a chord or sequence of notes, e.g., to provide the tonal effects of an inversion or to increase the ease with which a chord or sequence of keys 32*a*, 32*b* can be played on the keyboard 30, as described above.

The colors and textual indicia on the markers 20 continue to illustrate a chordal relationship between the notes corresponding to the key markers 20, even when the markers 20 are adjusted in their configuration, i.e., by moving one or more markers 20 from one end 26, 28 of the group to the opposite end 26, 28. For example, as shown in FIG. 3, the indicia on the markers 30 continue to illustrate the chordal relationships between the notes that is illustrated in FIG. 2, e.g., to indicate that an A note is a sixth relative to the C note.

The indicia of the numeric indicators 52 and/or the note designations 50 can be permanently fixed on the markers 20. For example, the indicators 52 can be provided on the key markers 20 by bonding or adhering the indicators 52 or by printing, engraving, painting, staining, or the like. FIG. 4 illustrates such an embodiment in which the indicator 52 is permanently fixed to the key markers 20. In this case, the indicia generally continue to illustrate the same chordal relationship regardless of reconfiguration of the markers 20. Multiple such devices can be provided to a user in order to illustrate different relationships. For example, while the device 10 of FIG. 1 illustrates the relationship of the various notes to a C note, other similar devices can be provided to illustrate the relationship of notes to another note, e.g., by illustrating another note with the 1 indicator 52. In this regard, FIG. 9, discussed below, illustrates the relationship of the various notes to an A note.

Alternatively, the indicia of the numeric indicators 52 and/or the note designations 50 can be releasably connected to the markers 20 so that each indicium is configured to be removed from one of the markers 20 and moved to another marker 20. In this regard, FIG. 5 illustrates a key marker 20 of another embodiment, in which the indicator 52 is printed on a label 60 and removably disposed on the key marker 20. In some cases, the label 60, which can be formed of a flexible sheet of vinyl or other polymers, can be affixed to the key marker 20 without adhesive, e.g., by merely applying the smooth label 60 to a smooth surface of the key marker 20 so that label 60 is not bonded thereto and can be peeled from the marker 20. FIG. 6 illustrates another embodiment of the key marker 20 having a removable indicator. In this case, the indicator 52 is printed on a tube-like or boot-like label 62 that defines an aperture 64 for receiving the key marker 20. That is, the key marker 20 can be inserted into the aperture 64 of the label 62 so that the label 62 is connected to the key marker 20 but is easily removable therefrom. As shown in FIGS. 5 and 6, a color or other designation can also be provided on the label 60, 62 to thus be removable with the indicator 52. Further, each label 60, 62 can define multiple indicators 52 (and/or note designations 50 or other textual or non-textual indicia) so that indicia can be selectively displayed. That is, the label 60 of FIG. 5 can define different indicators 52 on its two opposite sides so that one of two different indicators 52 can be displayed when the label 60 is applied to the marker 20 (the other indicator being disposed on the surface of the label 60 that is disposed against the marker 20). Similarly, the label 62 of FIG. 6 can define different indicators 52, colors 40, 42, and the like on its four sides so that any of the indicia can be displayed on the front of the marker 20. Further, the marker 20 can define colors or other indicia that can be selectively covered by the label 62.

Each of the labels 60, 62 can be selectively applied to any of various key markers 20 to thereby configure the markers 20 to illustrate any desired chordal relationships. Thus, in some cases, the device 10 can be provided to the user with an assortment of labels that are selectively applied to the markers 20 for illustrating any of various sets of chordal relationships. Thereafter, some or all of the labels can be removed from the markers 20 and the same or other labels can be applied to other markers 20 to illustrate a different set of chordal relationships. Alternatively, e.g., if the indicators are permanently fixed to the markers 20, the user can be provided with a set of multiple devices 10, each device illustrating different chordal relationships. If the markers 20 are shaped to correspond to the keys of the keyboard, the note designations 50 can be permanently provided on the markers 20 so that the designations 50 remain unchanged, even if the labels 60, 62 are reconfigured.

Figure 7:
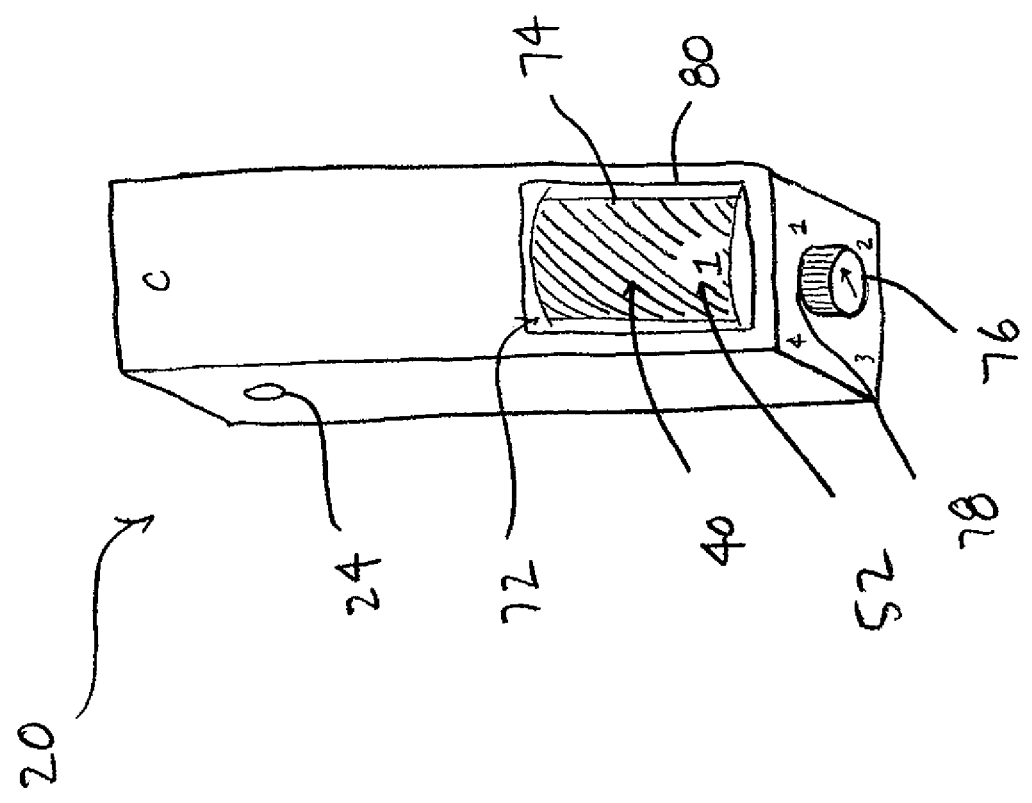
FIG. 7 is a perspective view illustrating a key marker of an instructional device according to yet another embodiment of the present invention.
Figure 8:
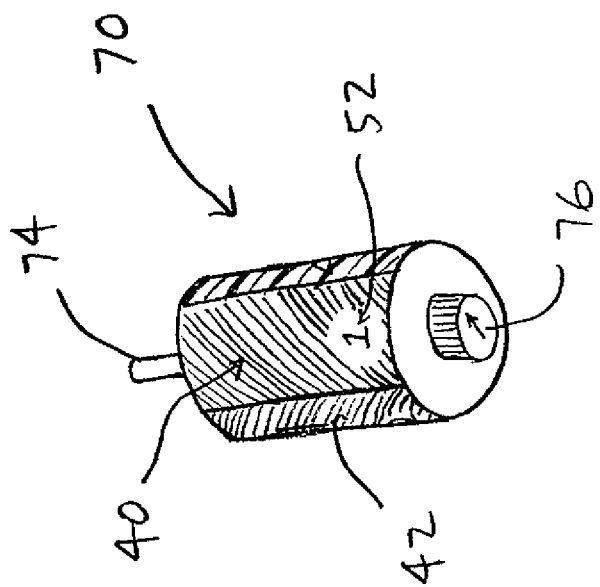
FIG. 8 is a perspective view illustrating an adjustable indicator of the key marker of FIG. 7.

In some cases, an adjustable indicator can be provided on each of the markers 20. For example, FIG. 7 illustrates a marker 20 that includes multiple indicia provided on a rotatable spool or wheel indicator 70 disposed in a hollow aperture 72 of the marker 20. The spool indicator 70, shown individually in FIG. 8, can define a shaft 74 extending in the axial direction of the spool, such that the shaft 74 can be inserted into a corresponding aperture in the marker 20 or otherwise rotatably mounted in the marker 20. An adjustment handle 76 can also be provided on the opposite side of the spool 70. The adjustment handle 76 can extend through a bore 78 in the bottom of the marker 20 so that the spool indicator 70 is retained in the marker 20 and configured to rotate about its axis to align any of various indicia provided on an outer surface of the spool indicator 70 with a window 80 in the marker 20. In other embodiments, the markers 20 can include other adjustable indicators, such as electronic indicators that selectively display one or more indicators according to the user's direction or a pre-programmed instructions or software, e.g., on a liquid crystal display, on a display of light emitting diodes, or the like.

While a single key marker 20 is shown in FIGS. 4-7, it is appreciated that each of the key markers 20 of the device 10 can similarly be provided with textual or non-textual indicia that are either fixed thereto, removable disposed thereon, or otherwise adjustable. Further, it is appreciated that a plurality of labels can be provided with the key markers 20 and selectively applied to the key markers 20 so that the key markers 20 can be provided in any of various configurations to illustrate different keys, scales, chords, and the like.

Figure 9:
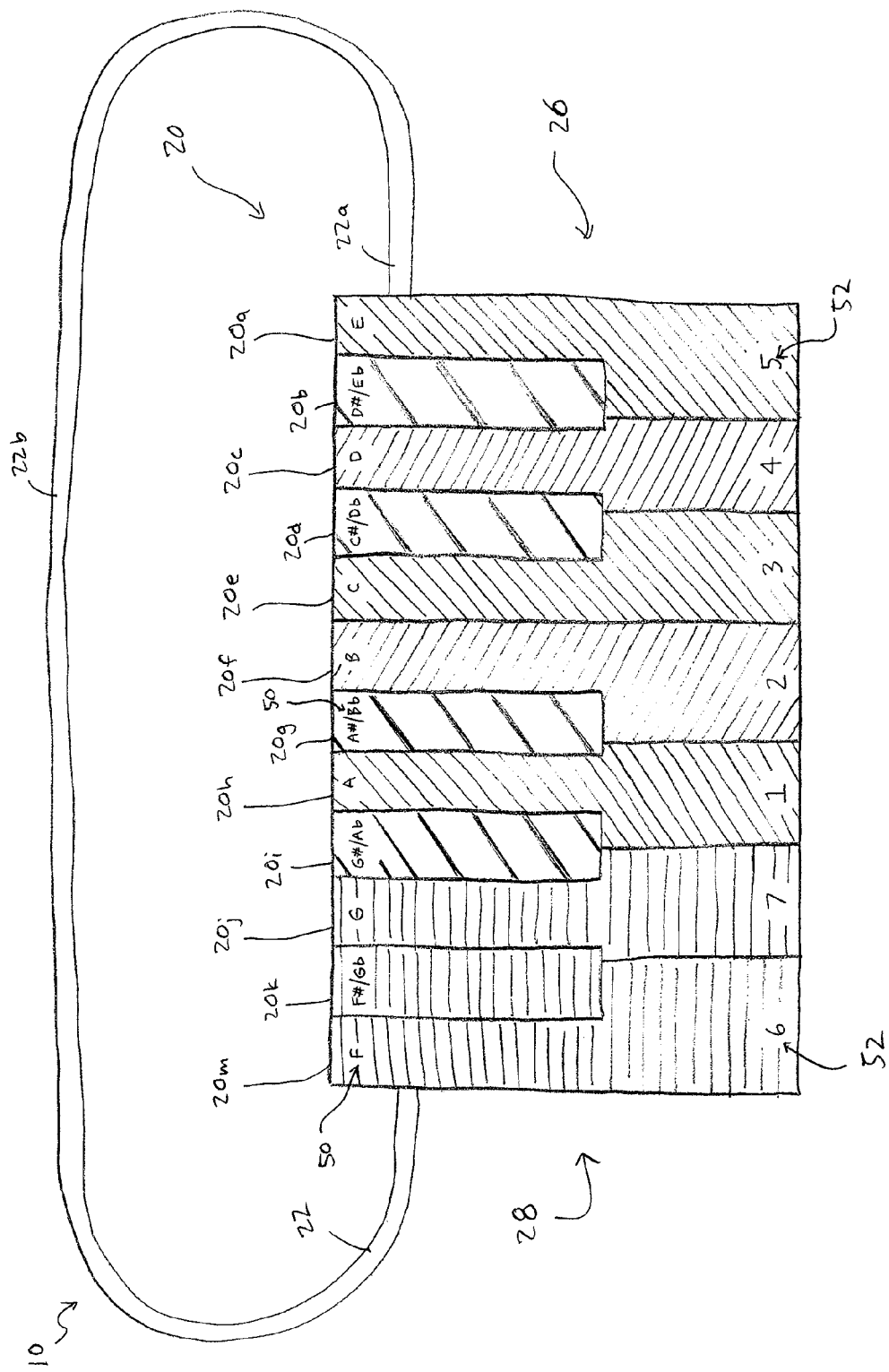
FIG. 9 is an elevation view illustrating an opposite side of the key markers of the instructional device of FIG. 2.

In some cases, each marker 20 of the device 10 can define multiple indicia, with different indicators being provided on different sides of each device 10. For example, FIG. 9 illustrates the device 10 of FIG. 2, showing a second side of the markers 20 that is opposite the side shown in FIG. 2. Indicia are provided on the second sides of the markers 20 and, as illustrated, the indicia are different than the indicia on the opposite sides of the markers 20. In this way, a first side of the device 10 can be configured to illustrate one set of chordal relationships, and a second side of the device 10 can be configured to illustrate a second, different set of chordal relationships. In particular, in FIG. 2, the markers 20 illustrate the chordal relationships of the C major scale; in FIG. 9, the markers 20 illustrate the chordal relationships of the A minor scale. Thus, in FIG. 2, the marker 20a corresponding to the key for playing a C note is identified by the 1 indicator, and the other markers 20 are referenced accordingly. For example, the key markers 20e, 20h corresponding to the keys for forming E and G notes are identified by the 3 and 5 indicators, respectively. In FIG. 9, the marker 20h corresponds to the key for playing an A note and is identified by the 1 indicator, and the other markers 20 are referenced accordingly, i.e., the key markers 20e, 20a corresponding to the keys for playing C and E notes are identified by the 3 and 5 indicators, respectively.

As shown in FIGS. 2 and 9, each markers 20 has the same color on its opposite sides, but the key markers 20 are used to designate different notes. That is, while the first side of the markers 20a (FIG. 2) is used to correspond to the key used to produce a C note on the keyboard, the second side of the marker 20a (FIG. 9) is used to correspond to the key used to produce an E note on the keyboard 30, as indicated by the note designations 50; the first side of the markers 20e (FIG. 2) corresponds to the key used to produce an E note on the keyboard, and the second side of the marker 20e (FIG. 9) corresponds to the key used to produce a C note on the keyboard 30; first side of the markers 20h (FIG. 2) corresponds to the key used to produce a G note on the keyboard, and the second side of the marker 20h (FIG. 9) corresponds to the key used to produce an A note on the keyboard 30.

The harmonic indicators 52 on the second side of the markers 20 indicate the relationships of the associated notes with the A note. That is, the marker 20*h* is indicated by the 1 indicator 52, and the relationship of the other notes is shown accordingly. For example, the key marker 20*e* is indicated to be a third, and key marker 20*a* is indicated to be a fifth of the A. The colors 40, 42, 44, 46, which are the same as the colors on the first sides of the markers 20, also indicate the relationship of the associated notes. For example, the first color 40 is provided on the markers 20*h*, 20*e*, 20*a* corresponding to notes that are the roots of the A minor chord (A, C, and E). Thus, the opposite sides of the device 10 can be used to illustrate two different sets of chordal relationships.

In cases where the same color is provided on both sides of each key marker 20, if the first side of the device 10 corresponds to a major key, then the opposite side of the device typically corresponds to the relative minor of the major key associated with the first side. The scale of the relative minor key begins with the harmonic sixth of the associated major scale. Thus, e.g., the key of A minor is the relative minor of the key of C major, and the sixth of the C scale (indicated in FIG. 2 by key marker 20*j*) is the note A. In other embodiments, different colors can be provided on opposite sides of each marker 20 such that different combinations of keys or chordal relationships can be illustrated by a single device.

The device 10 generally can be used as a tool for identifying and illustrating the chordal relationships between notes and can also be used for demonstrating and practicing the formation of chords or sequences of notes. In some cases, a user can adjust the key markers 20 on the device 10 for illustrating a particular chord or sequence of notes, and the user can play the corresponding notes on the keyboard 30 with reference to the device 10. As described above, the device 10 can be used in combination with the keyboard 30 in some cases, e.g., by resting the device 10 directly on the keyboard 30 to indicate the position of the different notes indicated by the device 10.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An instructional device for illustrating the positions of white and black keys of a piano keyboard, the device comprising:
    a support structure comprising a continuously extending guide member comprising a curved rod defining a continuous path;
    first and second pluralities of key markers, the first plurality of key markers corresponding in size to the white keys of the keyboard and the second plurality of key markers corresponding in size to the black keys, the first and second pluralities of key markers adjustably mounted on the support structure in a configuration corresponding to an octave of the keys of the keyboard, and each marker being adjustable from a position at one end of the markers to a position at an opposite end of the markers, and each key marker comprising a block disposed on and movable with respect to the guide member, the block of each key marker defining an aperture through which the rod extends; and
    a plurality of indicators provided on the markers, each indicator indicating a chordal relationship between a respective one of the markers and the other markers.

2. An instructional device according to claim 1 wherein the first plurality of key markers correspond in shape to the white keys of the keyboard, and the second plurality of key markers correspond in shape to the black keys of the keyboard, such that the key markers are structured to be disposed in a configuration that corresponds to the keys of the keyboard with each key marker of the first plurality configured to be disposed adjacent at least three of the other key markers.

3. An instructional device according to claim 2 wherein the width of each key marker is the same as a corresponding key of the keyboard, such that the key markers are structured to be disposed adjacent the keyboard with each key marker aligned with the corresponding key.

4. An instructional device according to claim 1 wherein the number of key markers is a multiple of twelve, such that the key markers correspond to a whole number of octaves of the keyboard.

5. An instructional device according to claim 1 wherein the plurality of indicators comprises colors indicative of a chordal relationship between corresponding notes of the keyboard.

6. An instructional device according to claim 1 wherein the markers define numeric indicia indicating a chordal relationship between corresponding notes of the keyboard.

7. An instructional device according to claim 1 wherein the plurality of indicators are fixed on the markers.

8. An instructional device according to claim 1 wherein the plurality of indicators are releasably connected to the markers such that the indicators are configured to be removed from the markers and moved to other markers.

9. An instructional device according to claim 1, wherein each marker defines a first indicator on a first side of the marker and a second indicator on a second side of the marker.

10. An instructional device according to claim 1, wherein the markers further define note designations, the note designation on each marker providing the identity of a note produced by a corresponding key of the keyboard.

11. An instructional device for illustrating the positions of white and black keys of a piano keyboard, the device comprising:
    a support structure;
    first and second pluralities of key markers, the first plurality of key markers corresponding in size to the white keys of the keyboard and the second plurality of key markers corresponding in size to the black keys, the first and second pluralities of key markers adjustably mounted on the support structure in a configuration corresponding to an octave of the keys of the keyboard, and each marker being adjustable from a position at one end of the markers to a position at an opposite end of the markers;
    a plurality of indicators provided on the markers, each indicator indicating a chordal relationship between a respective one of the markers and the other markers; and
    wherein the support structure comprises a continuously extending rod defining a closed loop path, each key marker being a block defining an aperture through which the rod extends such that the blocks are movably disposed on the guide member, the first plurality of key markers corresponding in shape to the white keys of the keyboard, and the second plurality of key markers corresponding in shape to the black keys of the keyboard, such that the key markers are structured to be disposed in a linear configuration on the rod with the key markers corresponding to the keys of the keyboard with each key marker in contact with at least three of the other key markers, and wherein the width of each key marker is the same as a corresponding key of the keyboard, such that the key markers are structured to be disposed adjacent the keyboard with each key marker aligned with the corresponding key.

12. An instructional device according to claim 11 wherein the plurality of indicators comprises colors indicative of a chordal relationship between corresponding notes of the keyboard, the markers defining numeric indicia indicating a chordal relationship between corresponding notes of the keyboard.

13. A method of illustrating the positions of white and black keys of a piano keyboard, the method comprising:

providing first and second pluralities of key markers on a support structure having a continuously extending guide member comprising a curved rod defining a continuous path, each key marker comprising a block disposed on and movable with respect to the guide member, the block of each key marker defining an aperture through which the rod extends, the first plurality of key markers corresponding in size to the white keys of the keyboard and the second plurality of key markers corresponding in size to the black keys, the first and second pluralities of key markers mounted on the support structure in a configuration corresponding to an octave of the keys of the keyboard; and selectively adjusting a respective marker from a position at one end of the markers to a position at an opposite end of the markers and thereby inverting the configuration of the markers such that a plurality of indicators provided on the markers indicate a chordal relationship between the markers.

14. A method according to claim 13 wherein said providing step comprises providing the first plurality of key markers corresponding in shape to the white keys of the keyboard, and the second plurality of key markers corresponding in shape to the black keys of the keyboard, such that the key markers are structured to be disposed in a configuration that corresponds to the keys of the keyboard with each key marker of the first plurality configured to be disposed adjacent at least three of the other key markers.

15. A method according to claim 13 wherein said providing step comprises providing each key marker of a width that is the same as a corresponding key of the keyboard, such that the key markers are structured to be disposed adjacent the keyboard with each key marker aligned with the corresponding key.

16. A method according to claim 13 wherein said providing step comprises providing a number of key markers that is a multiple of twelve, such that the key markers correspond to a whole number of octaves of the keyboard.

17. A method according to claim 13, further comprising providing a color on each key marker, the colors indicative of a chordal relationship between corresponding notes of the keyboard.

18. A method according to claim 13, further comprising providing numeric indicia on the markers, the indicia indicating a chordal relationship between corresponding notes of the keyboard.

19. A method according to claim 13, further comprising removing the indicator from each marker and moving the indicator to another one of the markers.

20. A method according to claim 13, further comprising providing note designations on the markers, the note designation on each marker providing the identity of a note produced by a corresponding key of the keyboard.

21. An apparatus according to claim 1, wherein each key marker of the first and second pluralities of key markers is configured to be separable with respect to the other key markers of the first and second pluralities of key markers.

22. An apparatus according to claim 1, wherein each key marker of the first and second pluralities of key markers has a respective one of the plurality of indicators provided thereon.

23. An apparatus according to claim 1, wherein each key marker of the second plurality of key markers is arranged on the support member so as to be disposed at least partially between adjacent key markers of the first plurality of key markers, such that the first plurality of key markers corresponds to the white keys of the keyboard and the second plurality of key markers corresponds to the black keys.

* * * * *